United States Patent [19]

Rhodes et al.

[11] Patent Number: 4,902,197
[45] Date of Patent: Feb. 20, 1990

[54] SEAL ARRANGEMENT FOR A CENTRIFUGAL TYPE OF PUMP

[75] Inventors: Richard O. Rhodes, San Francisco; Stephan Sears, Menlo Park; Dan M. Pomeroy, Redwood City, all of Calif.

[73] Assignee: Superstill Technology, Inc., Redwood City, Calif.

[21] Appl. No.: 206,212

[22] Filed: Jun. 13, 1988

Related U.S. Application Data

[63] Continuation of Ser. No. 911,965, Sep. 25, 1986, abandoned.

[51] Int. Cl.⁴ .............................................. F01D 11/00
[52] U.S. Cl. .................................. 415/111; 415/171.1; 277/13; 277/14 R
[58] Field of Search ................................ 277/13, 14 R

[56] References Cited

U.S. PATENT DOCUMENTS

| | | | |
|---|---|---|---|
| 3,455,561 | 7/1969 | Rinker et al. | 277/13 |
| 3,728,857 | 4/1973 | Nichols | 415/110 |
| 3,792,935 | 2/1974 | Randell | 415/110 |
| 3,987,973 | 10/1976 | Reinhall | 277/14 R |
| 4,236,867 | 12/1980 | Morris | 415/110 |
| 4,684,318 | 8/1987 | Mulders | 415/110 |

Primary Examiner—Henry A. Bennet
Attorney, Agent, or Firm—Flehr, Hohbach, Test, Albritton & Herbert

[57] ABSTRACT

A centrifugal type of pump, for example one used for compressing steam, is disclosed herein. This pump includes an impeller located within a pump housing and connected to a power driven shaft assembly extending through a cooperating opening in the housing from outside thereof so as to rotate with the shaft assembly about the axis of the shaft assembly relative to the housing, whereby to cause fluid in the housing, for example steam, to be centrifugally forced radially outward. The pump also includes a sealing arrangement for preventing the steam or other such fluid within the housing from escaping through the housing opening containing the shaft assembly. This sealing arrangement is designed to provide a continuous liquid seal extending circumferentially around an axial section of the shaft assembly within the housing opening and radially between the axial shaft section and housing druing operation of the pump, whereby to seal the opening against the passage of steam or other such fluid within the housing.

36 Claims, 4 Drawing Sheets

SEAL ARRANGEMENT FOR A CENTRIFUGAL TYPE OF PUMP

This is a continuation of application Ser. No. 911,965 filed September 25, 1986 now abandoned.

The present invention relates generally to fluid seal arrangements and more particularly to a seal arrangement forming part of a centrifugal type of pump.

The present invention is especially relevant to a centrifugal type of pump which is used to compress steam. This specific pump includes an impeller located within the pump housing and connected to a power driven shaft assembly extending through a cooperating opening in the housing from outside thereof so as to rotate with the shaft assembly about the axis of the latter relative to the housing. Steam is introduced into the housing through a cooperating inlet and is acted upon by the impeller therein and caused to be centrifugally forced and thereby compressed radially outward. The compressed steam ultimately leaves the housing through a cooperating outlet at an increased pressure. In an actual working example, the steam enters the housing at a pressure of about 14.7 psi and it exits the housing at an elevated pressure of approximately 16.7 psi, thereby resulting in a pressure differential across the housing of approximately 2 psi. In this same embodiment, the impeller and shaft are being driven at a speed of approximately 10,000 rpm in a relatively hot environment, specifically one which is approximately 220° F.

For a number of reasons it is important that none of the steam in the pump housing described immediately above leak through the housing opening through which the rotating shaft extends. One important reason is that any steam which does leak through this opening might reach and corrode the bearing system used to support the shaft for rotation. As will be seen hereinafter, the present invention provides for an improved arrangement for sealing this opening against the passage of steam.

In view of the foregoing, an object of the present invention is to provide a pump of the type described above including an arrangement for sealing the housing opening around its rotating shaft assembly but without requiring the typical solid-to-solid contact in order to seal, thereby eliminating wear.

Another object of the present invention is to carry out the last object in an uncomplicated and reliable manner.

Still another object is to provide a sealing arrangement which to a limited extent compensates for changes in pressure drop across the pump housing.

As will be seen hereinafter, the foregoing objects are achieved by providing a sealing arrangement with means forming part of the pump's shaft assembly and part of its housing in order to produce a continuous liquid seal. This seal extends circumferentially around an axial section of the shaft assembly within the housing's opening through which the shaft assembly passes and radially between this axial shaft section and the housing during operation of the pump, whereby to seal the opening against the passage of fluid within the housing. In an actual working embodiment, the fluid within the housing is steam and the liquid forming the seal is water which is provided by condensing some of the steam in the manner to be described.

The present invention will be described in more detail hereinafter in conjunction with the drawings wherein.

Figure 1:
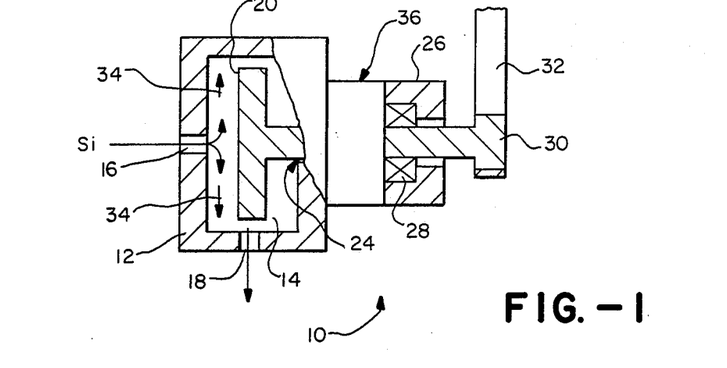
FIG. 1 is a partially broken away, cross sectional diagrammatic illustration of a centrifugal type of pump designed to compress and thereby increase the pressure of steam.

Turning now to the drawings, wherein like components are designated by like reference numerals throughout the various figures, attention is first directed to FIG. 1. This figure illustrates a centrifugal type of pump 10 which is designed to act on steam at, for example, 212° F. and a pressure of about 14.7 psi in order to compress the steam to a higher pressure, for example about 15.7 psi. One particular use for such a pump is in the distilling process described in copending patent application Ser. No. 604,023, filed April 26, 1984. In the system described there, the water to be distilled or purified is first converted to steam and thereafter ultimately condensed back to water. Between these steps, for reasons described in the pending application, the pressure of the steam to be condensed is raised slightly, for example on the order of about 1 psi. Pump 10 is especially suitable for that task and therefore if it is used for that purpose it must be placed in a relatively hot environment, on the order of 220° F. However, while pump 10 is specially suitable for this particular environment, it is to be understood that the invention embodied in the pump to be described hereinafter will readily form a part of other centrifugal type of pumps which act not only on steam but other forms of fluids and particularly gases.

Still referring to FIG. 1, pump 10 is shown including a pump housing 12 defining an inner chamber 14 and including an inlet 16 for carrying steam $S_I$ at one pressure into the chamber and an outlet 18 for allowing the steam SO at a slightly higher pressure to exit the chamber. An impeller 20 is fixedly connected to one end of a shaft 22 which extends into the housing through a cooperating opening 24. The other end of the shaft, outside housing 12, is supported for rotation about its own axis by means of a bearing assembly 26 including bearings 28 and includes a pulley 30 at its otherwise free end. The pulley is itself connected to one end of a belt 32 which is driven by a motor (not shown) or could be connected directly to a motor (without the belt) in order to rotate the drive shaft and therefore the impeller 20 about the drive shaft at the desired speed, for example approximately 10,000 rpm or other speeds.

All of the components of pump 10, as described thus far, may be conventional and readily providable. When the impeller is rotated at the appropriate speed, steam $S_I$ is drawn into chamber 14 through inlet 16 and centrifugally forced radially outward (with respect to the axis of the drive shaft), as indicated by arrows 34. As it does so, the steam compresses against the outer wall of chamber 14 and thereby increases in pressure within the chamber by a specific amount, for example 1 psi. As the pump continues to operate and steam $S_I$ continues to enter chamber 14, steam $S_O$ at the greater pressure exits the chamber through outlet 18.

For a number of reasons, as stated previously, it is important that all of the steam which enters the housing chamber 14 through inlet 16 exits it through outlet 18 and that none leaks out through opening 24. In order to ensure this, overall pump 10 includes a sealing arrangement which is designed in accordance with the present invention and which is generally indicated at 36 in FIG. 1. As will be described in more detail, this sealing arrangement provides a continuous liquid seal extending circumferentially around an axial section of shaft 22 within opening 24 and radially between the axially shaft section and housing 12 during operation of the pump, whereby to seal the opening against the passage of steam within housing chamber 14.

Figure 2:
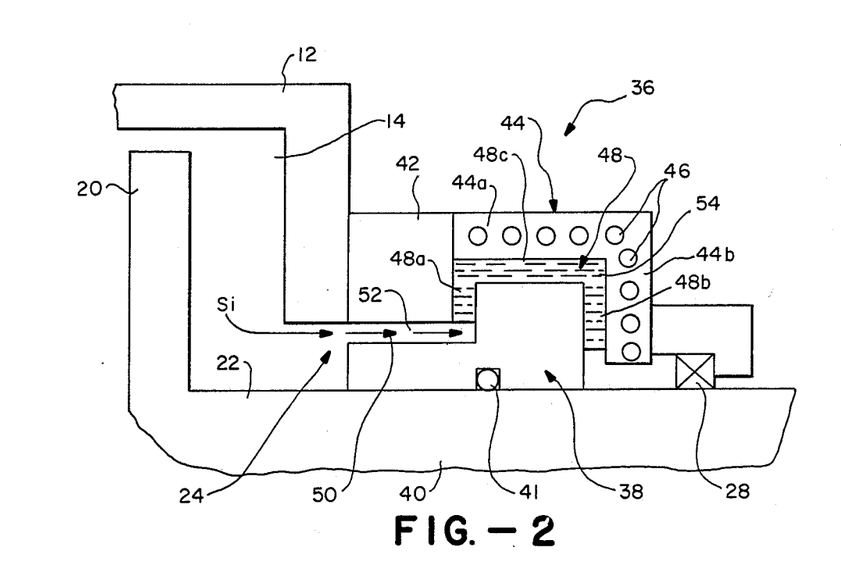
FIG. 2 is an enlarged cross sectional diagrammatic illustration of a sealing arrangement forming part of the pump illustrated in FIG. 1 and designed in accordance with the present invention.

Turning now to FIG. 2, attention is directed to sealing arrangement 36. As seen there, this arrangement includes a rotor 38 which is fixedly connected to an axial section 40 of shaft 22 so as to form with the shaft an overall shaft assembly that rotates about the shaft's axis. An O-ring seal 41 is located within a cooperating groove in the rotor and engaged against shaft section 40 for providing a seal between the rotor and shaft section. For reasons to be described below, rotor 38 includes a circumferential segment 38A and a diametrically larger circumferential segment 38B. The sealing arrangement also includes as part of overall housing 12 an outer ring 42 extending around the outside and spaced from outer segment 38A and a circumferential cooling sleeve 44 having an axially extending segment 44A located around and spaced from rotor segment 38B and a radially extending segment 44B location around shaft 22 adjacent but axially spaced from rotor segment 38B. As illustrated in FIG. 2, the cooling sleeve includes a single or plurality of ducts, manifolds, passageways or the like generally indicated at 46 for carrying cooling fluid, for example air or water for reasons to be discussed hereinafter.

As illustrated in FIG. 2, rotor 38 and the combination of ring 42 and sleeve 44 cooperate with one another to define an axially extending, radially inwardly directed generally U-shaped passageway 48 which serves as part of opening 24. More specifically, but for the seal which is provided within this passageway, as will be discussed below, steam $S_I$ within housing chamber 14 could pass into an innermost axial section 50 of passageway 24, as indicated by the arrows 52 and thereafter through generally U-shaped passageway 48 and thereby ultimately reach bearings 28. In this regard, it should be noted that the generally U-shaped configuration of passageway 48 includes radially extending leg segments 48A and 48B and an axially extending cross segment 48C. For reasons to become apparent hereinafter, it should also be noted that the leg segment 48B extends further radially inward than the leg segment 48A.

In accordance with the present invention, rotor 38 and ring 42 are constructed of a thermally insulating type of material, for example hard plastic, so that its inner surfaces, that is, those surfaces in direct communication with opening 24 including U-shaped passageway 48 do not cause the steam passing therethrough to condense. At the same time, they insulate cooling sleeve 44 from the heat genreated by the steam in housing 14 so that it is not so difficult to keep sleeve 44 cool. Cooling sleeve 44, on the other hand, is maintained at a temperature which will condense the steam as it passes through U-shaped passageway 48. As a result, the passageway will fill with water (e.g., the condensed steam) which is generally indicated at 54. During operation of pump 10, that is, as shaft 22 and rotor 38 rotate, leg segment 48A and cross segment 48C of passageway 48 fill entirely with condensed water while segment 48B is shown only partially filled, although extending radially inward further than leg segment 48A. At the same time, note that the water does not extend radially inward beyond leg segments 48A and 48B. The reasons for this will be discussed below. For the moment, it suffices merely to say that the liquid filled passageway serves as a liquid seal for preventing steam within housing chamber 14 from escaping out of opening 24.

Figure 3A:
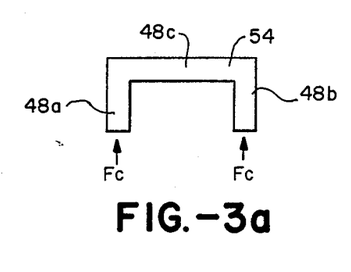
FIGS. 3A and 3B diagrammatically illustrate operational aspects of the sealing arrangement shown in FIG. 2.

Referring to FIGS. 3A and B, attention is now directed to the way in which liquid seal 54 is created. (Referring first to FIG. 3A, it will be assumed the shaft 22 and rotor 38 are rotating but that the pressure within housing chamber 14 is equal to the pressure outside the chamber. Under these conditions, the only radially outward forces acting on liquid seal 54 are the centrifugal forces represented by the force vectors $F_C$. Note that the centrifugal forces acting on both ends of the liquid seal are equal under these circumstances and they are the only forces acting on the seal since the pressures at the two ends are equal. Under these circumstances, the centrifugal forces will maintain the liquid seal in the configuration shown in FIG. 3A, that is, the U-shaped passageway will remain filled along its cross segment 48C and equally within its leg segments 48A and 48B.

Figure 3B:
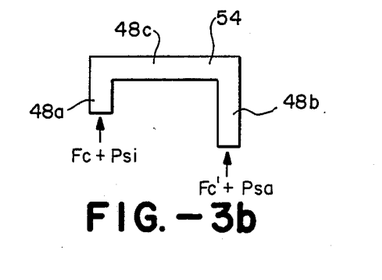

Referring specifically to FIG. 3B, let it be assumed that the pressure within housing chamber 14 is slightly greater than the pressure outside the chamber, for example approximately 1 psi. Under these circumstances, in order to reach equilibrium state, the liquid seal is shifted so that more of leg segment 48B is filled with water than leg segment 48A to compensate for the lower outside pressure. Specifically, the volume of water within leg segment 48B must be sufficiently larger than the volume of water in leg segment 48A so that the resultant force due to the combination of $F_C$ plus the greater pressure $P_{SI}$ is equal to the resultant force due to the combination of $F'_C$ (which is slightly greater than $F_C$ due to increased volume) plus the lesser pressure $P_{SA}$. In this way, the liquid seal is self-regulating, that is, it will shift to the left or the right within passageway 48 depending upon the difference in pressure across its ends. In this regard, it is important to make sure that leg segment 48B is sufficiently longer than leg segment 48A so as to compensate for the expected differences in pressure between the two ends of the passageway. In addition, leg segment 48B must be sufficiently longer than segment 48A so as to insure than segment 48B does not overflow before segment 48A. This insures that water does not reach seal 28.

Figures 4, 6A, 6B, 6C:
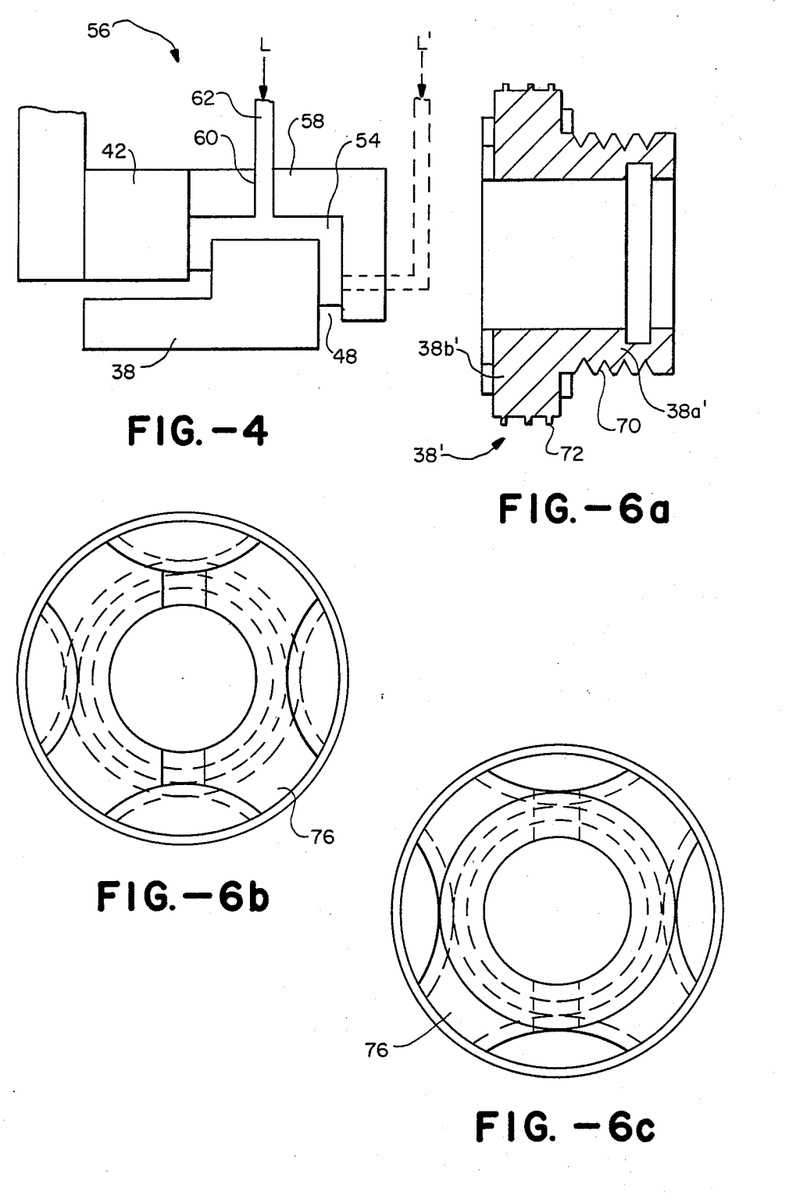
FIG. 4 is a cross sectional, diagrammatic illustration of a modified sealing arrangement which might form part of the overall pump shown in FIG. 1.
FIGS. 6A, 6B and 6C illustrate a rotor member forming part of the actual working pump of FIG. 5.

The sealing arrangement 36, as described above, utilizes as its source of liquid 54, the steam 52, within chamber 14. While this is the preferred source and is incorporated into actual working embodiments of the present invention, as will be seen hereinafter, the present invention, contemplates the utilization of an external source, as best illustrated in FIG. 4. The seal arrangement shown there is generally indicated by the reference numeral 56 and includes the same rotor 38 and ring 42 and a slightly modified cooling sleeve 58 which nevertheless combines with rotor 38 and ring 42 to provide the same U-shaped passageway 48 in order to provide liquid seal 54. The only difference between sealing arrangement 54 and sealing arrangement 36 is that the former does not obtain its liquid seal from the steam but rather an external source, as indicated above. As a result, cooling sleeve 58 includes an opening therethrough, generally indicated at 60 which is connected to a suitable source of water by means of conduit 62 so as to supply the passageway with water. Note that the passageway is filled at a point along its cross segment. The inlet pressure to the passageway from the source should be adjusted so as to balance with the centrifugal forces and pressures at the ends of the passageway. As an alternative, by locating the inlet from the liquid source at a point near the end of leg segment 48B, as indicated by dotted lines in FIG. 4, it would not be necessary at all to pressurize the external source.

Figure 5:
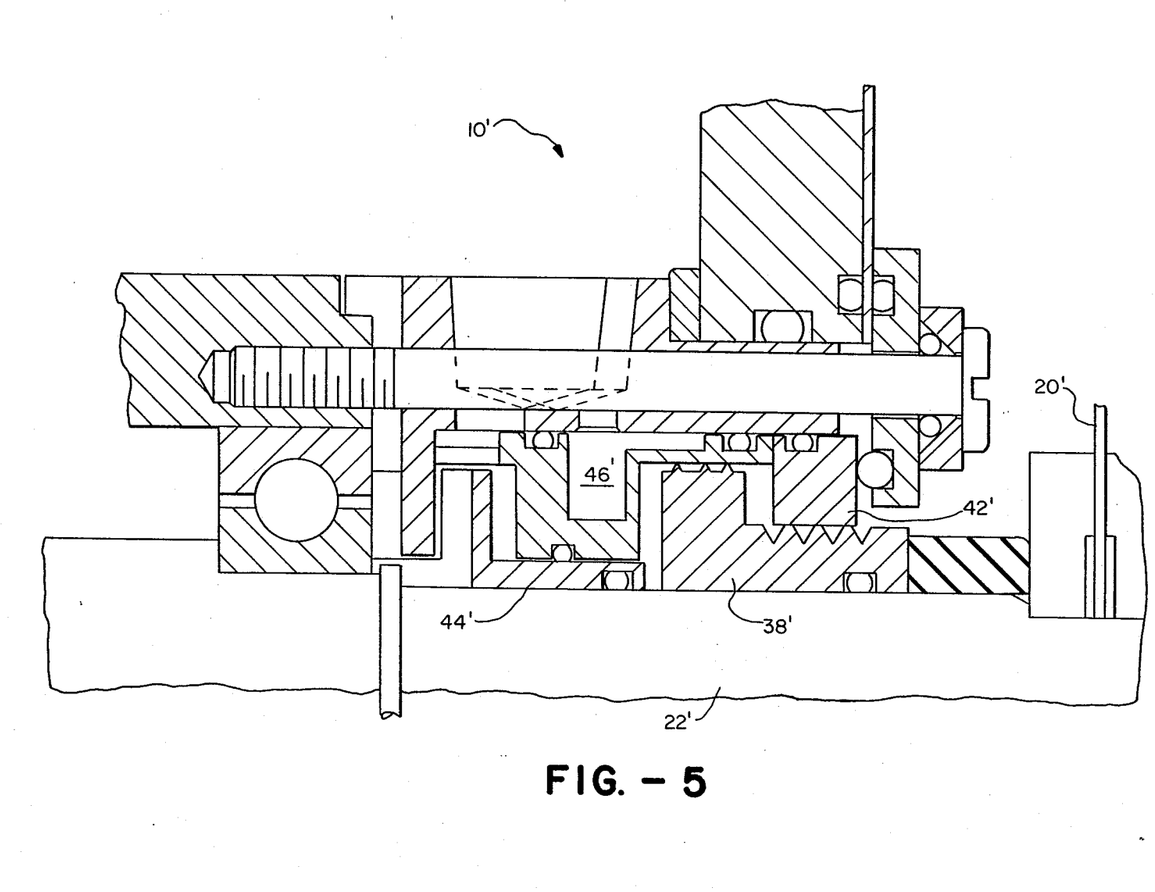
FIG. 5 is a cross sectional view of part of a centrifugal type of pump designed in accordance with one actual embodiment of the present invention.
Figure 7:
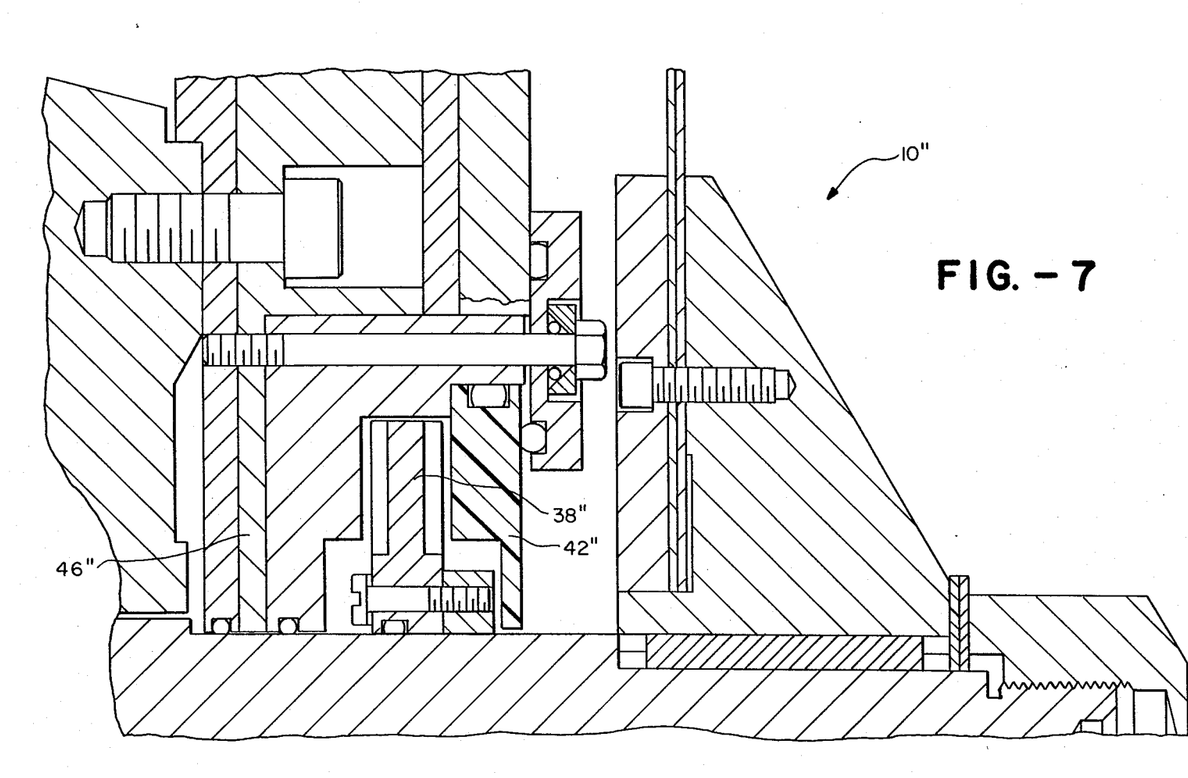
FIG. 7 is a cross sectional illustration of an actual working centrifugal type of pump designed in accordance with a second embodiment of the present invention.

FIGS. 5 and 6A–C illustrate an actual working centrifugal type pump including a sealing arrangement designed in accordance with one embodiment of the present invention and FIG. 7 illustrates an actual working pump including a sealing arrangement designed in accordance with a second embodiment of the present invention. The components in each of these latter embodiments which correspond with the components of pump 10 are indicated by the same reference numeral but primed (in the case of the FIGS. 5 and 6 embodiment) and double primed (in the case of the FIG. 7 embodiment) in order to distinguish the components of the actual embodiments from the components of pump 10. Thus, pump 10' illustrated in FIG. 5 includes a shaft 22', and impeller 20', a rotor 38' and so on. The rotor 38' is illustrated in detail in FIGS. 6A–6C. Note that the rotor includes axially spaced teeth 70 along the outer surface of its segment 38A' and similar teeth 72 along the outer surface of its segment 38B'. As illustrated in FIG. 5, these teeth extend close to but do not touch the cooperating ring 42' and cooling sleeve 44'. These teeth are provided to ensure that the steam entering the passageway does not pass through the passageway so quickly that the steam does not have a chance to condense. Note also in FIGS. 6B and 6C that the axially facing opposing surfaces of rotor 38' include vanes 74 and 76 which serve to ensure that the steam and liquid within the passageway are forced centrifugally outward. Note also that the inner sleeve 44' includes a single cooling manifold 46' rather than a series of openings or passageways.

Turning specifically to FIG. 7, the pump 10" shown there includes an air cooled sleeve 44" including venting slots 46". The rotor is shown at 38" and the insulating ring at 42".

All three of the pump embodiments described above, that is, pumps 10, 10' and 10", have been described for use in pressurizing steam. It is to be understood that the present invention is not limited to pressurizing steam or using water as its liquid seal. The pump could act on other fluids, both liquids and gases, so long as the liquid seal within its passageway is sufficient to prevent passage of the fluid when acted upon by the pump in passing through the passageway. Moreover, while a centrifugal pump has been described, it is to be understood that the present invention could be used with other types of pumps which are internally pressurized.

What is claimed is:

1. In a pump including impeller or other such means located within a pump housing and connected to a power driven shaft assembly extending through a generally axially extending cooperating opening in said housing from outside thereof so as to rotate with said shaft assembly about the axis of the latter relative to said housing, whereby to cause fluid within said housing to be pressurized, the improvement comprising a sealing arrangement for preventing said fluid within said housing from escaping from said housing through said opening, said arrangement including means forming part of said shaft assembly and part of said housing for providing an axially static continuous liquid seal extending circumferentially around an axial section of said shaft assembly within said opening and radially between said axial shaft section and said housing during operation of the pump whereby to seal said opening against the passage of said fluid from within said housing, said fluid within said housing being steam and said liquid seal being water and said seal providing means including means for condensing some of said steam to use as said water seal.

2. The improvement according to claim 1 wherein said seal providing means includes said axial shaft section of said shaft assembly and a fixed member extending circumferentially around and spaced from said axial shaft section, said shaft section and fixed member defining therebetween an axially extending, radially inwardly directed generally U-shaped passageway which serves as part of said cooperating opening and wherein during operation of the pump said passageway contains liquid which serves as said liquid seal.

3. The improvement according to claim 2 wherein the generally U-shaped configuration of said passageway includes first and second radially extending leg segments thereof, the first one being closer to the interior of said housing than said second leg segment, and an axially extending cross segment therebetween and wherein, during operation of the pump, said liquid fills all of said cross segment and at least part of each leg segment at an adjoining end of said cross segment.

4. The improvement according to claim 3 wherein the pressure within said housing is greater than the pressure outside the housing during operation of the pump, whereby to cause more of said liquid to be located within said second leg segment than said first leg segment.

5. The improvement according to claim 1 wherein said condensing means includes a sleeve forming part of said fixed member and means for cooling said sleeve sufficient to condense steam at the pressure within said passageway.

6. The improvement according to claim 5 wherein said axial shaft section and a ring forming part of said fixed member are configured so as to minimize the condensation of steam on their surfaces, said axial shaft section and ring being formed of a thermal insulating material.

7. In a centrifugal type of gas compressing pump including impeller means located within a pump housing and connected to a power driven shaft assembly extending through a cooperating opening in said housing from outside thereof so as to rotate with said shaft assembly about the axis of the latter relative to said housing, whereby to cause gas within said housing to be centrifugally forced radially outward and thereby compressed within the housing, the improvement comprising a sealing arrangement for preventing said gas within said housing from escaping from the housing through said opening, said arrangement including an axial section of said shaft assembly and a fixed assembly extending circumferentially around and spaced from said axial shaft section, said shaft section and fixed assembly defining therebetween an axially extending, radially inwardly directed generally U-shaped passageway which serves as part of said cooperating opening between the interior of said pump housing, whereby the gas within said housing is able to pass into said passageway, said seal providing means also including means for sealing said passageway with liquid which is maintained within said passageway in a axially non-flowing state so as to prevent the gas within said housing from passing therethrough, whereby said liquid serves as an axially static liquid seal within said housing opening between said housing and rotating shaft during operation of said pump, some gas from within said housing passing into said passageway during the initial operation of the pump and said means for filling said passageway with liquid including means for condensing the gas that enters the passageway into liquid so as to fill said passageway sufficient to provide said liquid seal.

8. In a method of operating a centrifugal type of pump including impeller means located within a pump housing and connected to a power driven shaft assembly extending through a cooperating opening in said housing from outside thereof so as to rotate with said shaft assembly about the axis of the latter relative to said housing, whereby to cause fluid within said housing to be centrifugally forced radially outward, the improvement comprising the step of preventing said fluid within said housing from escaping from said housing through said opening by providing a continuous liquid seal extending circumferentially around an axial section of said shaft assembly within said opening and radially between said axial shaft section and said housing during operation of the pump, whereby to seal said opening against the passage of said fluid within said housing said fluid within said housing being steam and said liquid seal being water and including the step of condensing some of said steam to use as said water seal.

9. A pump apparatus for pressurizing a given fluid, comprising:
(a) a pump housing defining an internal fluid compression chamber and inlet and outlet means into and out of said chamber for accommodating the passage of said fluid through the chamber from said inlet means to said outlet means;
(b) means for pressurizing said fluid within said compression means including impeller means within said chamber, a shaft assembly having one end thereof connected with said impeller means within said chamber and extending out of said housing through a cooperating passageway separate from said inlet and outlet means, and means located outside said housing for rotating said shaft assembly and said impeller means about the axis of the shaft assembly, whereby to cause fluid within said housing to be pressurized; and
(c) sealing means for preventing said fluid within said compression chamber from escaping said chamber through said passageway, said sealing means including means for maintaining liquid in an axially non-flowing static state entirely around an axial section of said shaft assembly and entirely filling an axial section of said passageway whereby said liquid seals said passageway against the passage of said fluid from within said housing; said fluid within said housing being steam and said liquid seal being water and said seal providing means including means for condensing some of said steam to use as said water seal.

10. An apparatus according to claim 9 wherein said water seal fills only an axial section of said passageway, so that neither said steam nor any of the water reaches the outside end of the passageway.

11. An apparatus according to claim 10 wherein said passageway section containing said sealing water is generally U-shaped in configuration including first and second radially extending leg segments, the first one being closer to said compression chamber than said second one.

12. The apparatus according to claim 11 wherein the pressure within said housing is greater than the pressure outside the housing during operation of the pump, whereby to cause more of said water to be located within said second leg segment than said first leg segment.

13. The improvement according to claim 6 wherein said second leg segment is longer than said first leg segment.

14. The improvement according to claim 1 wherein said fluid is gas.

15. In a centrifugal type of gas compressing pump including impeller means located within a pump housing and connected to a power driven shaft assembly extending through a cooperating opening in said housing from outside thereof so as to rotate with said shaft assembly about the axis of the latter relative to said housing, whereby to cause gas within said housing to be centrifugally forced radially outward and thereby compressed within the housing, the improvement comprising a sealing arrangement for preventing said gas within said housing from escaping from the housing through said opening, said arrangement including an axial section of said shaft assembly and a fixed assembly extending circumferentially around and spaced from said axial shaft section, said shaft section and fixed assembly defining therebetween an axially extending, radially inwardly directed generally U-shaped passageway which serves as part of said cooperating opening between the interior of said pump housing, whereby the gas within said housing is able to pass into said passageway, said seal providing means also including means for sealing said passageway with liquid which is maintained within said passageway in a nonaxially-flowing state so as to prevent the gas within said housing from passing therethrough, whereby said liquid serves as an axially static liquid seal within said housing opening between said housing and rotating shaft during operation of said pump, some gas from within said housing passing into said passageway during the initial operation of the pump and wherein said means for filling said passageway with liquid includes means for condensing the gas that enters the passageway into liquid so as to fill said passageway sufficient to provide said liquid seal, said condensing means includes a cooling plate forming part of said fixed assembly and means for maintaining said cooling plate sufficiently cold to condense said gas that enters said passageway.

16. In an apparatus including a housing defining a chamber in which fluid and a rotating means within said chamber cooperate with one another such that the fluid therein is at a different pressure than the pressure outside the chamber, said apparatus also including a shaft assembly connected at one end to said rotating means for rotation therewith, said shaft assembly extending through a cooperating passageway in said housing so that its opposite end is located in an area which is outside said chamber and which is at a different pressure than said chamber, the improvement comprising a sealing arrangement for preventing said fluid within said housing chamber from escaping from said chamber through said passageway, said arrangement including means forming part of said shaft assembly and part of said housing for providing a continuous axially static liquid seal extending circumferentially around an axial section of said shaft assembly within said passageway and radially between said axial shaft section and said housing during operation of the pump whereby to seal said passageway against the passage of said fluid from within said housing.

17. In an apparatus including a housing defining a chamber in which fluid and a rotating means within said chamber cooperate with one another such that the fluid therein is at a different pressure than the pressure outside the chamber, said apparatus also including a shaft assembly connected at one end to said rotating means for rotation therewith, said shaft assembly extending through a cooperating passageway in said housing so that its opposite end is located in an area which is outside said chamber and which is at a different pressure than said chamber, the improvement comprising a sealing arrangement for preventing said fluid within said housing chamber from escaping from said chamber through said passageway, said arrangement including means forming part of said shaft assembly and part of said housing for providing a continuous axially static liquid seal extending circumferentially around an axial section of said shaft assembly within said passageway and radially between said axial shaft section and said housing during operation of the pump whereby to seal said passageway against the passage of said fluid from within said housing; said fluid within said housing being steam and said liquid seal being water and said seal providing means including means for condensing some of said steam to use as said water seal.

18. In a method of operating an apparatus including a housing defining a chamber in which fluid and a rotating means within said chamber cooperate with one another such that the fluid therein is at a different pressure than the pressure outside the chamber, said apparatus also including a shaft assembly connected at one end to said rotating means for rotation therewith, said shaft assembly extending through a cooperating passageway in said housing so that its opposite end is located in an area which is outside said chamber and which is at a different pressure than said chamber, the improvement comprising the steps of preventing said fluid within said housing chamber from escaping from said chamber through said passageway, said last-mentioned step including providing a continuous axially static liquid seal extending circumferentially around an axial section of said shaft assembly within said passageway and radially between said axial shaft section and said housing during operation of the pump whereby to seal said passageway against the passage of said fluid from within said housing, said fluid within said housing being steam and said liquid seal being water and including the step of condensing some of said steam to use as said water seal.

19. In a pump including impeller or other such means located within a pump housing and connected to a power driven shaft assembly extending through a generally axially extending cooperating opening in said housing from outside thereof so as to rotate with said shaft assembly about the axis of the latter relative to said housing, whereby to cause fluid within said housing to be pressurized, the improving comprising a sealing arrangement for preventing said fluid within said housing from escaping from said housing through said opening, said arrangement including means forming part of said shaft assembly and part of said housing for providing an axially static continuous liquid seal extending circumferentially around an axial section of said shaft assembly within said opening and radially between said axial shaft section and said housing during operation of the pump whereby to seal said opening against the passage of said fluid from within said housing said seal displaying a fixed configuration depending on the difference in pressure between configuration depending on the difference in pressure between the interior and exterior of said housing, said seal providing means including a source of liquid located outside said housing for use as said seal and means for continuously introducing liquid from said source into said opening between said shaft section and said housing during operation of the pump so as to maintain fixed said configuration of said seal so long as the difference in pressure between the interior and exterior of said housing remains constant.

20. The improvement according to claim 19 wherein said liquid is introduced into said passageway at a point along said cross segment.

21. The improvement according to claim 19 wherein said liquid is introduced into said passageway at a point along said second leg segment.

22. The improvement according to claim 19 wherein said seal providing means includes said axial shaft section of said shaft assembly in a fixed member extending circumferentially around and spaced from said axial shaft section, said shaft section and fixed member defining therebetween an axially extending, radially inwardly directed generally U-shaped passageway which serves as said cooperating opening and wherein during operation of the pump said passageway contains liquid which serves as said liquid seal.

23. The improvement according to claim 22 wherein the generally U-shaped configuration of said passageway includes first and second radially extending leg segments thereof, the first one being closer to the interior of said housing than said second leg segment, and an axially extending cross segment therebetween and wherein, during operation of the pump, said liquid fills all of said cross segment and at least part of each leg segments at an adjoining end of said cross segment.

24. The improvement according to claim 23 wherein the pressure within said housing is greater than the pressure outside the housing during operation of the pump, whereby to cause more of said liquid to be located within said second leg segment than said first leg segment.

25. In a method of operating a centrifugal type of pump including impeller means located within a pump housing and connected to a power driven shaft assembly extending through a cooperating generally axially extending opening in said housing from outside thereof so as to rotate with said shaft assembly about the axis of the latter relative to said housing, whereby to cause fluid within said housing to be centrifugally forced radially outward, the improvement comprising the step of preventing said fluid within said housing from escaping from said housing through said opening by providing a continuous axially static liquid seal extending circumferentially around an axial section of said shaft assembly within said opening and radially between said axial shaft section and said housing during operation of the pump, whereby to seal said opening against the passage of said fluid within said housing, said fluid within said housing being a condensable gas and said liquid seal being condensate from said gas and including the step of condensing some of said gas to use as said liquid seal.

26. In a method of operating a centrifugal type of pump including impeller means located within a pump housing and connected to a power driven shaft assembly extending through a cooperating generally axially extending opening in said housing from outside thereof so as to rotate with said shaft assembly about the axis of the latter relative to said housing, whereby to cause fluid within said housing to be centrifugally forced radially outward, the improvement comprising the step of providing said axially extending opening with a generally u-shaped segment having radially extending legs along its length and preventing said fluid within said housing from escaping from said housing through said opening by providing a continuous axially static liquid seal extending circumferentially around an axial section of said shaft assembly within the u-shaped segment of said opening radially between said axial shaft section and said housing during operation of the pump, whereby to seal said opening against the passage of said fluid within said housing, said method including the steps of providing a source of liquid located outside said housing for use as said seal and introducing liquid from said source into said the u-shaped segment of opening between said shaft section and said housing during operation of said pump, so as to maintain constant the radial depth of said seal within the radial legs of the u-shaped segment so long as the difference in pressure between the interior and exterior of said housing is constant.

27. In an apparatus including a housing defining a chamber in which fluid and a rotating means within said chamber cooperate with one another such that the fluid therein is at a different pressure that the pressure outside the chamber, said apparatus also including a shaft assembly connected at one end to said rotating means for rotation therewith, said shaft assembly extending through a cooperating passageway in said housing so that its opposite end is located in an area which is outside said chamber and which is at a different pressure than said chamber, said passageway including a u-shaped segment having radially extending legs, the improvement comprising a sealing arrangement for preventing said fluid within said housing chamber from escaping from said chamber through said passageway, said arrangement including means forming part of said shaft assembly and part of said housing for providing a continuous axially static liquid seal which has a u-shaped configuration with radially extending legs and which extends circumferentially around an axial section of said shaft assembly within said passageway and radially between said axial shaft section and said housing during operation of the pump whereby to seal said passageway against the passage of fluid from within said housing, said seal providing means including source of liquid located outside said housing for use as said seal and means for continuously introducing liquid from said source into said opening between said shaft section and said housing during operation of the pump so as to maintain constant the radial depth of said seal within the radially extending legs of its u-shaped configuration so long as the difference in pressure within and outside said housing chamber is constant.

28. In a method of operating an apparatus including a housing defining a chamber in which fluid and a rotating means within said chamber cooperate with one another such that the fluid therein is at a different pressure than the pressure outside the chamber, said apparatus also including a shaft assembly connected at one end to said rotating means for rotation therewith, said shaft assembly extending through a cooperating passageway in said housing so that its opposite end is located in an area which is outside said chamber and which is at a different pressure than said chamber, the improvement comprising the steps of preventing said fluid within said housing chamber from escaping from said chamber through said passageway, said last-mentioned step including providing a continuous axially static liquid seal extending circumferentially around an axial section of said shaft assembly within said passageway and radially between said axial shaft section and said housing during operation of the pump whereby to seal said passageway against the passage of said fluid from within said housing, said fluid within said housing being a condensable gas and said liquid seal being condensate from said gas and including the step of condensing some of said gas to use as said liquid seal.

29. The improvement according to claim 7 wherein said condensing means includes a cooling plate forming part of said fixed assembly and means for maintaining said cooling plate sufficiently cold to condense said gas that enters said passageway.

30. The improvement according to claim 29 wherein said fixed assembly also includes a ring member disposed between said housing and said cooling plate, said ring member and said axially shaft section being configured so as to minimize condensation of said gas on their surface exposed to said gas, said ring member and cooling plate being constructed of a thermal insulating material.

31. The improvement according to claim 16 wherein said shaft assembly includes a shaft and rotor fixedly connected to and extending around the shaft for rotation therewith, said rotor serving as said axially shaft section.

32. The improvement according to claim 29 wherein said gas is steam and said liquid is condensed water from said steam.

33. The improvement according to claim 19 wherein the pressure of said liquid introduced into said opening is dependent upon the difference in pressure between the interior and exterior of said housing.

34. The improvement according to claim 19 wherein said liquid is introduced into said opening under ambient pressure only.

35. The improvement according to claim 26 wherein said liquid is introduced into the u-shaped segment of said opening under a pressure which is dependent upon the difference in pressure between the interior and exterior of said housing.

36. The improvement according to claim 26 wherein said liquid is introduced into said u-shaped segment of said opening under ambient pressure.

* * * * *